(12) United States Patent
Jing et al.

(10) Patent No.: US 9,259,118 B2
(45) Date of Patent: Feb. 16, 2016

(54) BEVERAGE EXTRACTION DEVICE CONVENIENT FOR PACKAGE REMOVAL

(75) Inventors: Yudong Jing, Cixi (CN); Tan Zhang, Cixi (CN)

(73) Assignee: Ningbo AAA Group Electric Appliance Co., Ltd., Zhouxiang Town (CN)

( * ) Notice: Subject to any disclaimer, the term of this patent is extended or adjusted under 35 U.S.C. 154(b) by 527 days.

(21) Appl. No.: 13/876,627

(22) PCT Filed: Jan. 31, 2011

(86) PCT No.: PCT/CN2011/000169
§ 371 (c)(1),
(2), (4) Date: Mar. 28, 2013

(87) PCT Pub. No.: WO2012/079268
PCT Pub. Date: Jun. 21, 2012

(65) Prior Publication Data
US 2013/0180410 A1 Jul. 18, 2013

(30) Foreign Application Priority Data

Dec. 13, 2010 (CN) .......................... 2010 1 0601290

(51) Int. Cl.
*A47J 31/40* (2006.01)
*A47J 31/36* (2006.01)

(52) U.S. Cl.
CPC ............ *A47J 31/407* (2013.01); *A47J 31/3633* (2013.01); *A47J 31/3638* (2013.01)

(58) Field of Classification Search
CPC .. A47J 31/407; A47J 31/3638; A47J 31/3633
USPC ......................................................... 99/295
See application file for complete search history.

(56) References Cited

U.S. PATENT DOCUMENTS

| 4,794,853 | A | * | 1/1989 | Weber ..................... | A47J 31/06 210/480 |
| 5,240,722 | A | * | 8/1993 | Louridas ............... | A47J 31/005 426/112 |
| 5,555,791 | A | * | 9/1996 | McNeill ............... | A47J 31/4467 210/480 |
| 2002/0088348 | A1 | * | 7/2002 | Cortese ............... | A47J 31/3638 99/295 |
| 2006/0230941 | A1 | * | 10/2006 | Ryser .................. | A47J 31/3633 99/275 |
| 2009/0007794 | A1 | * | 1/2009 | Cortese ............... | A47J 31/3638 99/289 R |
| 2009/0249961 | A1 | * | 10/2009 | Cheng ................. | A47J 31/3638 99/289 R |

(Continued)

FOREIGN PATENT DOCUMENTS

CN 201044719 Y * 4/2008
CN 201295154 Y * 8/2009

(Continued)

*Primary Examiner* — David Angwin
*Assistant Examiner* — John J Norton
(74) *Attorney, Agent, or Firm* — Wang Law Firm, Inc.

(57) ABSTRACT

The invention relates to a beverage extraction device with easy rejection of capsules including a housing, a first frame and a second frame. The first frame has a length and a chamber with a side wall. Each jaw is movably connected to a side support of the second frame. The first shaft is formed on the front portion of each jaw, the second shaft is formed on the back portion of each jaw. The device further includes two guiding grooves and two guiding plates, each guiding groove has a front end that bends outwardly; each guiding plate has a pushing portion protruding toward the central line of the housing, the first shaft of each jaw slides inside the leading groove defined on each guiding plate.

9 Claims, 16 Drawing Sheets

(56) References Cited

U.S. PATENT DOCUMENTS

| | | | | |
|---|---|---|---|---|
| 2010/0101428 A1* | 4/2010 | Fin | A47J 31/3638 | 99/295 |
| 2010/0224077 A1* | 9/2010 | Jing | A47J 31/3638 | 99/295 |
| 2011/0030562 A1* | 2/2011 | Ambrosini | A47J 31/60 | 99/289 R |
| 2011/0162530 A1* | 7/2011 | Castellani | A47J 31/3638 | 99/279 |
| 2012/0207893 A1* | 8/2012 | Kruger | A47J 31/3633 | 426/431 |
| 2013/0092031 A1* | 4/2013 | Magno | A47J 31/3633 | 99/297 |

FOREIGN PATENT DOCUMENTS

| | | | | |
|---|---|---|---|---|
| CN | 101669768 A | * | 3/2010 |
| JP | 2000060733 A | * | 2/2000 |

* cited by examiner

US 9,259,118 B2

BEVERAGE EXTRACTION DEVICE CONVENIENT FOR PACKAGE REMOVAL

RELATE APPLICATIONS

This application is a national phase entrance of and claims benefit to PCT Application for a beverage extraction device with easy rejection of capsules, and the Application thereof, PCT/CN2011/000169, filed on Jan. 31, 2011, which claims benefit to Chinese Patent Application 201010601290.7, filed on Dec. 13, 2010. The specifications of both applications are incorporated here by this reference.

FIELD OF THE INVENTION

The present invention relates to a beverage extraction device with easy rejection of capsules, and the beverage extraction device mainly refers to the coffeemaker.

DESCRIPTION OF THE PRIOR ART

Coffeemaker is a beverage extraction device, and primarily has two directions of beverage extraction, namely a horizontal direction and a vertical direction. For the sake of convenient operation, the coffeemakers have the function of automatically rejecting capsules.

For example, a Chinese Patent CN1130345Y (Patent No.: ZL94193279.6), titled Capsule for Packaging Quantificational Ground Coffee and Pressure Type Coffeemaker Using the Capsule thereof, discloses a coffeemaker which allows the capsule to automatically fall off. The coffeemaker can make the capsule automatically fall off, a special structure for driving the limiting block to rotate needs to be specially designed, thus complicating the structure. In addition, the specific mechanical structure for driving the limiting block to rotate is not provided in the specification.

For this reason, the inventor of the present applicant designs a coffeemaker with simple and reliable structure, stable and convenient operation and good touch feeling. That is the Chinese Utility Model CN201044719Y (Patent No.: ZL200720110811.2), titled Capsules Automatically Rejecting Mechanism of Coffeemaker. The coffeemaker is characterized in that two sides of a second frame are movably connected with a jaw respectively; the front portion of each jaw has a limiting part bending and extending toward the front of the second frame; the two limiting parts face each other and define a space between them for holding the capsule; the front portions of the jaws can open and close relatively to the second frame; first shafts are installed on the front portions of the jaws along the height direction, and second shafts are installed on the rear portions of the jaws along the height direction; two pairs of guiding grooves are arranged on the housing for guiding the upper and lower portions of the corresponding jaws; each pair of the guiding grooves consists of an upper guiding groove and a lower guiding groove; under the guiding and fitting of each pair of the guiding grooves and the corresponding first shafts, at least the front portions of the jaws are driven to complete one opening and closing relatively to the second frame when the second frame completes one whole backward movement.

The structure of the above-mentioned coffeemaker is improved, but the structure of the guiding grooves is complicated. It is hard to machine a guiding groove structure on the housing. In addition, for the above-mentioned patents, the situation that capsules are stuck on the front end face of the second frame may occur in the process of the rejection of capsules, as a result, the jaws open and the capsule is hard to fall off; furthermore, it is needed to dispose a spring inside the first frame so as to ensure the capsule to be ejected outward for a certain distance relative to the first frame when the second frame moves backward, and also to ensure that the jaws can completely clamp the capsule away from the concave chamber of the first frame. Therefore, the above-mentioned patents can be further improved.

SUMMARY OF THE INVENTION

It is an object of the present invention to provide a beverage extraction device with easier delivery and rejection of capsules in view of the prior art. This device also has the advantage of simple and rational structure.

For achieving the above stated object, the beverage extraction device with easy rejection of capsules comprises a housing having a central line and two sides; a first frame and a second frame both disposed inside the housing, the first frame having a length and a chamber with a side wall for holding a capsule with a circular edge, the second frame having a front and two side supports and the second frame being slidable along the length of the first frame; two jaws, each jaw being movably connected to a side support of the second frame, and the two jaws being slidable together with the second frame, each jaw having a front portion and a back portion, the front portion of each jaw extending to the front of the second frame for holding the capsule; two guiding plates slidably mounted on the two sides of the housing; wherein, each jaw has a plurality of shafts one of which is fitted and assembled in a guiding rail formed on each side of the housing, when the second frame slides forward to a intermediate position, the second frame drives the front portions of two jaws to open, and when the second frame slides backward to the intermediate position, the second frame drives the front portions of two jaws to close; each guiding plate has a pushing portion protruding toward the central line of the housing for pushing the circular edge of the capsule, and the side wall of the chamber of the first frame is provided with two notches for receiving the two pushing portions; a leading groove is defined on each guiding plate, which has a front end that bends outwardly, and one of the shafts of each jaw can slide inside the corresponding leading groove and drive each guide plate to slide forward and backward.

Preferably, the front portion of each jaw has a limiting part bending and extending toward the front of the second frame, and the two limiting parts face each other and define a space between them for holding the capsule. The capsule can be positioned at the front of the second frame thanks to the limitation of the limiting parts to the capsule, that is, the capsule is held.

Preferably, the beverage extraction device with easy rejection of capsules further comprises a lower portion with a concave arc shape attached to each limiting part. In this way, the capsule can be supported by the lower portion of each limiting part to some extent in the case that the jaws are in a closed position, so that the capsule can be more stably placed in a space formed between the two limiting parts for holding the capsule when they face each other.

Preferably, the shafts of each jaw comprises a first shaft and a second shaft, the first shaft is formed on the front portion of each jaw protruding transversally away from each jaw, the second shaft is formed on the back portion of each jaw protruding transversally away from each jaw, and each guiding rail further comprises one guiding groove, one guiding groove on each side of the housing is for guiding both of the first shaft and the second shaft of each jaw, and each guiding groove has a front end that bends outwardly, when the first shaft slides along the guiding groove, the second frame drives the front portion of each jaw to complete one opening and one closing when the second frame completes one whole forward and backward movement; the first shaft of each jaw is located in the corresponding leading groove and slides inside the leading groove; when the front end of the capsule enters the chamber, the two jaws open and each first shaft is located at a foremost end of the corresponding leading groove, the two guide plates can be driven to move forward; when the two jaws are in a closed position and each first shaft is located at a rearmost end of a corresponding leading grooves, the two guiding plates can be driven to move backward and so as to make the capsule leave from the chamber.

The jaws can open and close stably relatively due to the cooperation of the two shafts and the two grooves. Obviously, other similar means of shafts and grooves can be used to make the second frame drive the front portion of each jaw to complete one opening and one closing when the second frame completes one whole forward and backward movement. For example, the shape of the grooves may be changed correspondingly.

Preferably, the guiding groove consists of a straight rear portion, a straight front portion, an inclined middle portion connecting the straight rear portion and the straight front portion; the inclined middle portion slants from the straight rear portion outwardly to the straight front portion, and the second shaft slides inside the straight rear portion; the leading groove consists of a straight rear groove, a straight front groove, and an inclined middle groove connecting the straight rear groove with the straight front groove; the inclined middle groove slants from the straight rear groove outwardly to the straight front groove; and when the front portion of the capsule is in the chamber, the first shaft is in the straight front portion and also at the foremost end of the straight front groove. The above descriptions deal with the specific structure of the guiding grooves and the leading grooves, which have a front end that bends outwardly. Such guiding grooves and leading grooves have simple structures and can be processed conveniently.

As a further improvement, the first frame has two opposing slots, two opposing slots are parallel with the central line of the housing, an inserting board is attached to each guiding plate for engaging the slot and can slide forward and backward, and the pushing portion is attached to an inserting board. The front portion of the guiding plate and the first frame are jointed with each other through the inserting board and the slot, therefore the guiding plates are better restricted inside the housing and can only slide forward and backward relatively to the housing.

Preferably, two protrusions, opposing to each other, are attached to the side wall of the second frame, and an inserting hole is formed on each jaw for the protrusions to pass through. Of course, the jaw may be arranged on the side portion of the second frame through other manner. For example, a spherical recess is formed on the inside surface of the jaw, the portion of each protrusion is designed to a spheroid shape fitting with the spherical recess, and the portion of each protrusion is received and assembled inside the spherical recess of each jaw. In this way, the jaws can open and close relatively to the second frame. Each protrusion may also be designed to a shape that bends upwardly, and the jaws are top-down sleeved onto the protrusions. In this way, the jaws can also open and close relatively to the second frame. Variations of this structure may also be employed.

Preferably, the housing is composed of a lower casing with a left side and a right side and an upper casing with a left side and a right side, the upper casing covering on the lower casing. In this way, it is convenient to assemble other components into the housing. The two guiding grooves are respectively formed at the left side and the right side of the lower casing, two straight sliding grooves are formed at the left side and the right side of the upper casing for receiving the second shafts. The straight grooves have a function of leading the upper portion of the second shafts, so that the jaws can operate more stably.

To further restrict and limit the guiding plates, two limiting grooves are formed on the upper casing, one limiting groove on the left side and one limiting groove on the right side, for guiding movement of the guiding plates. So the guiding plates can be ensured to stably slide only forward and backward.

Compared with the prior art, in the present invention, the capsule is first held between the two limiting parts at the front portions of the jaws and then moves forward together with the second frame and the jaws, the limiting parts at the front portion of the jaws open under the guiding and fitting cooperation of the shafts and the grooves when needed, and the capsule is delivered into the chamber of the first frame successfully. In the meanwhile, the backward movement of the jaws motivates the pushing portion to push the circular edge of the capsule outward to push the capsule out from the chamber, so far the rejection of the capsule is completed; the second frame moves backward continuously, and then the limiting parts at the front portions of the jaws are in a closed position under the cooperation of the first shaft and the guiding groove. During the whole rejection process of the capsule, it is not needed to pop up the capsule by a spring and then hold the capsule again by the limiting parts of the jaws, and the whole rejection process of the capsule is simple and easy; furthermore, all components in the device are with simple structure and convenient in assembly.

DETAILED DESCRIPTION OF THE PREFERRED EMBODIMENT

Figure 1:
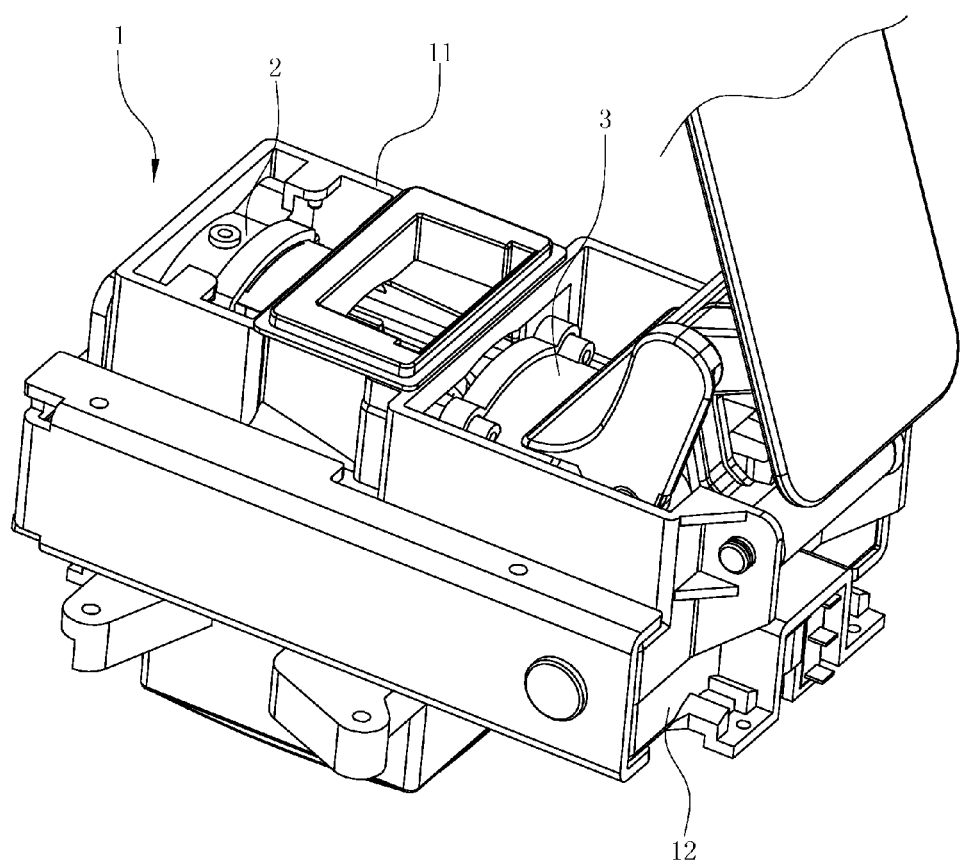
FIG. 1 is a perspective view of the beverage extraction device in accordance with an embodiment of the present invention (at the original status before extraction).
Figure 2:
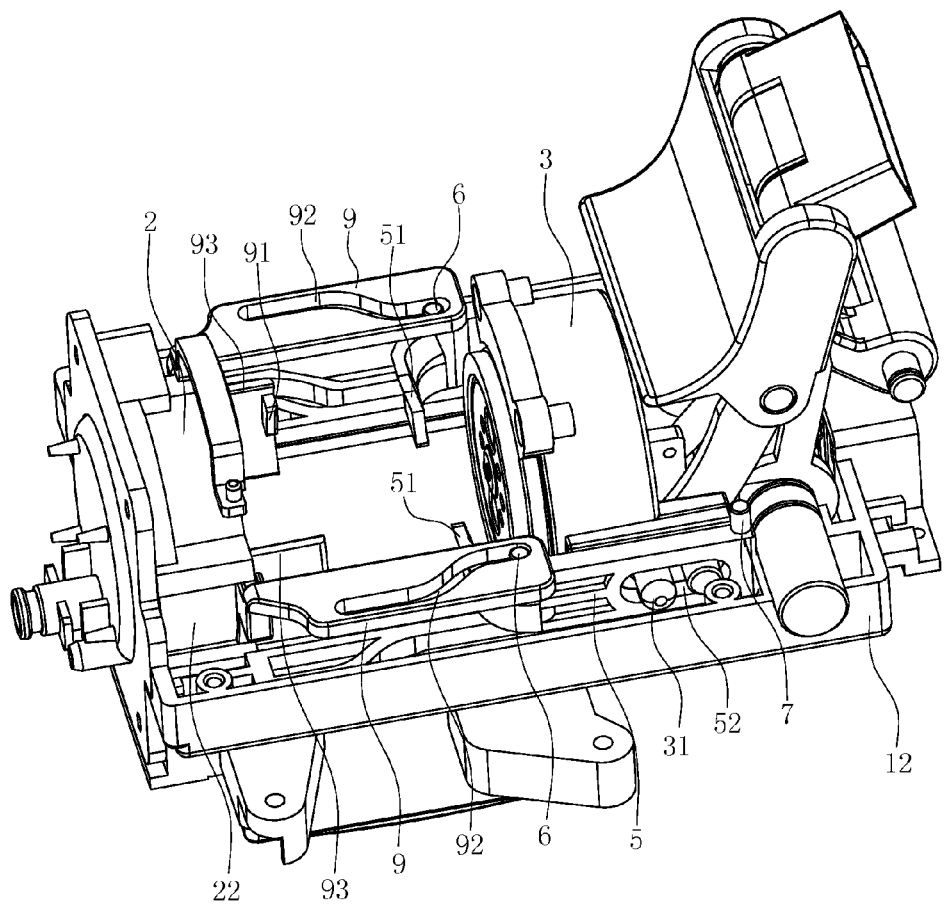
FIG. 2 is a perspective view of the beverage extraction device without the upper casing in accordance with the embodiment of the present invention (at the original status before extraction).
Figure 3:
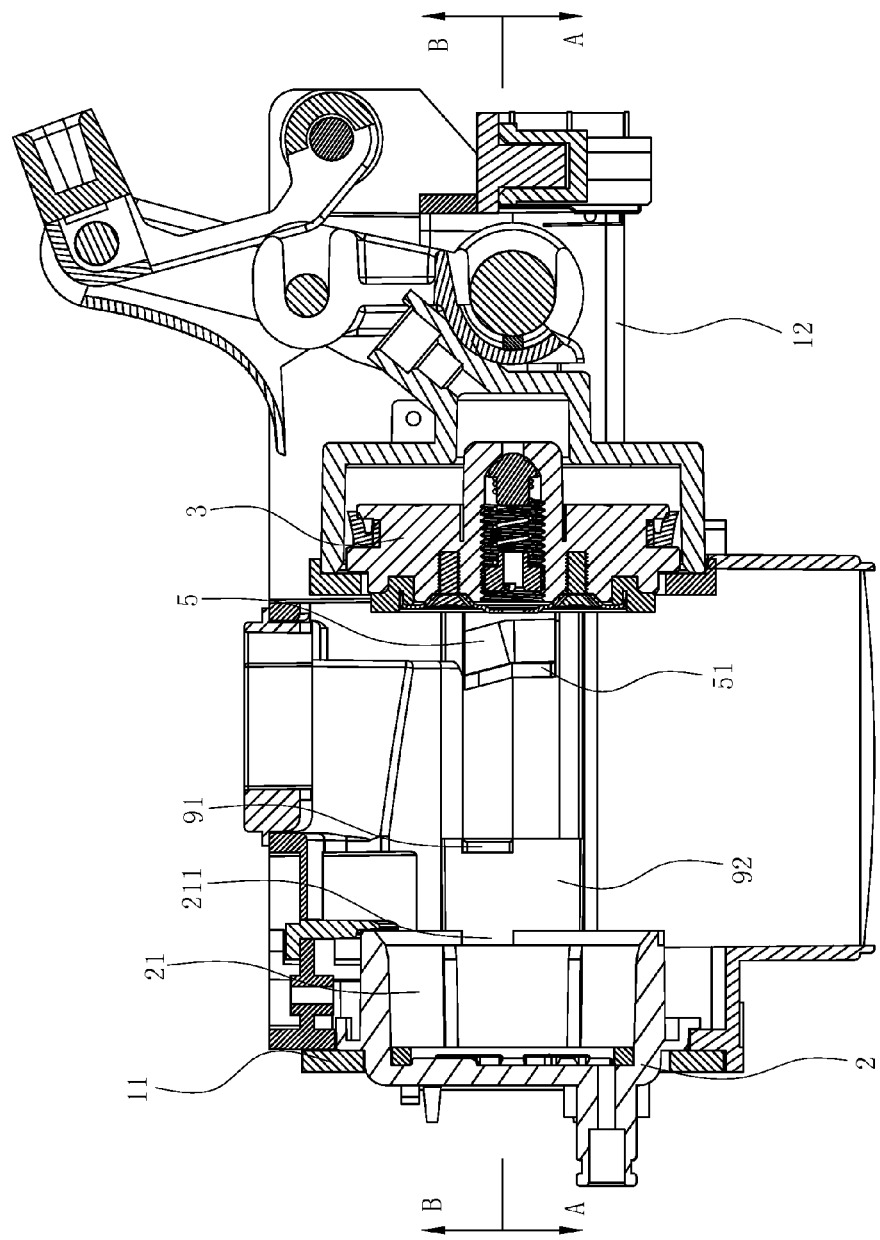
FIG. 3 is a sectional view of the beverage extraction device in accordance with the embodiment of the present invention (at the original status before extraction).
Figure 4:
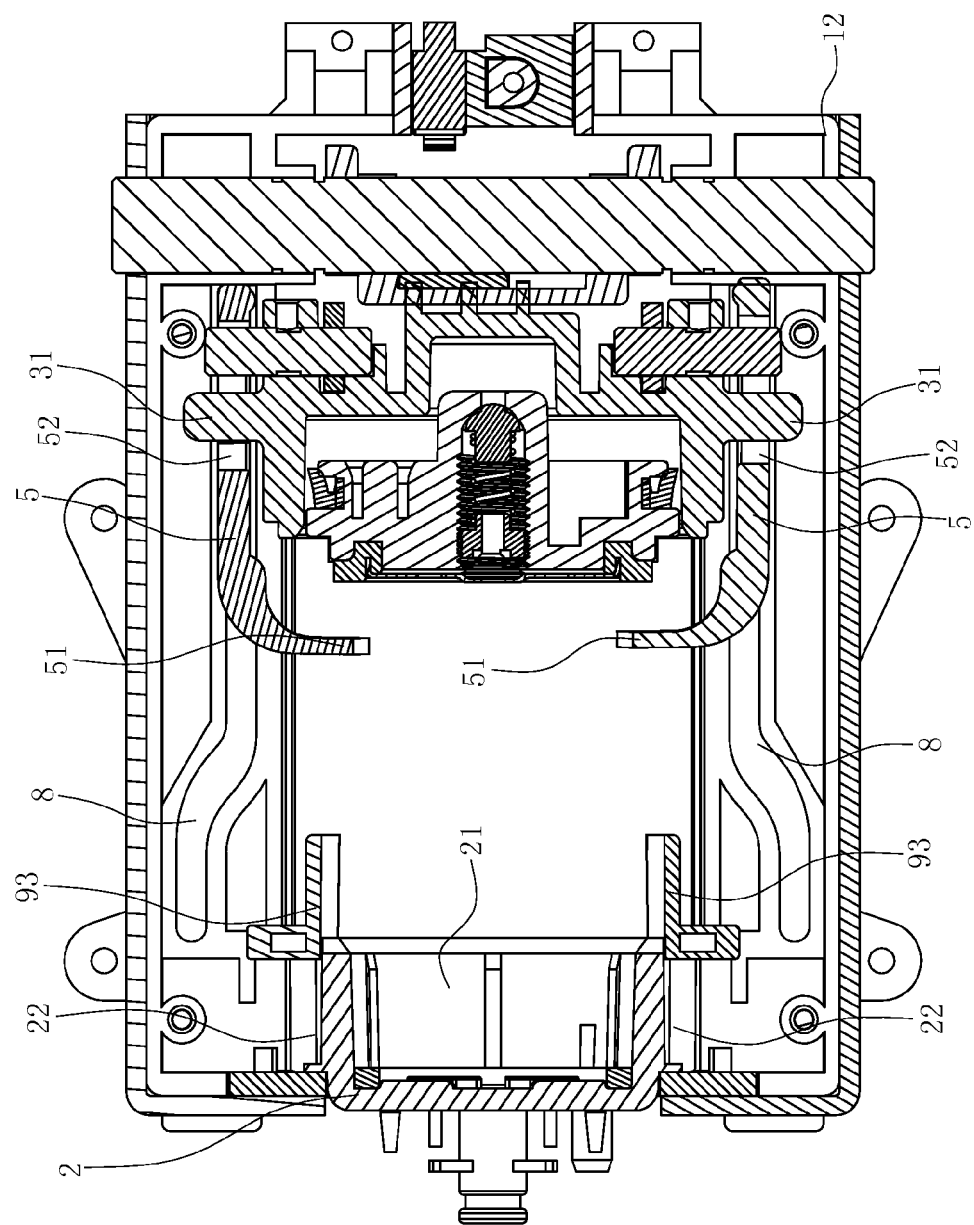
FIG. 4 is the sectional view of A-A way of FIG. 3.
Figure 5:
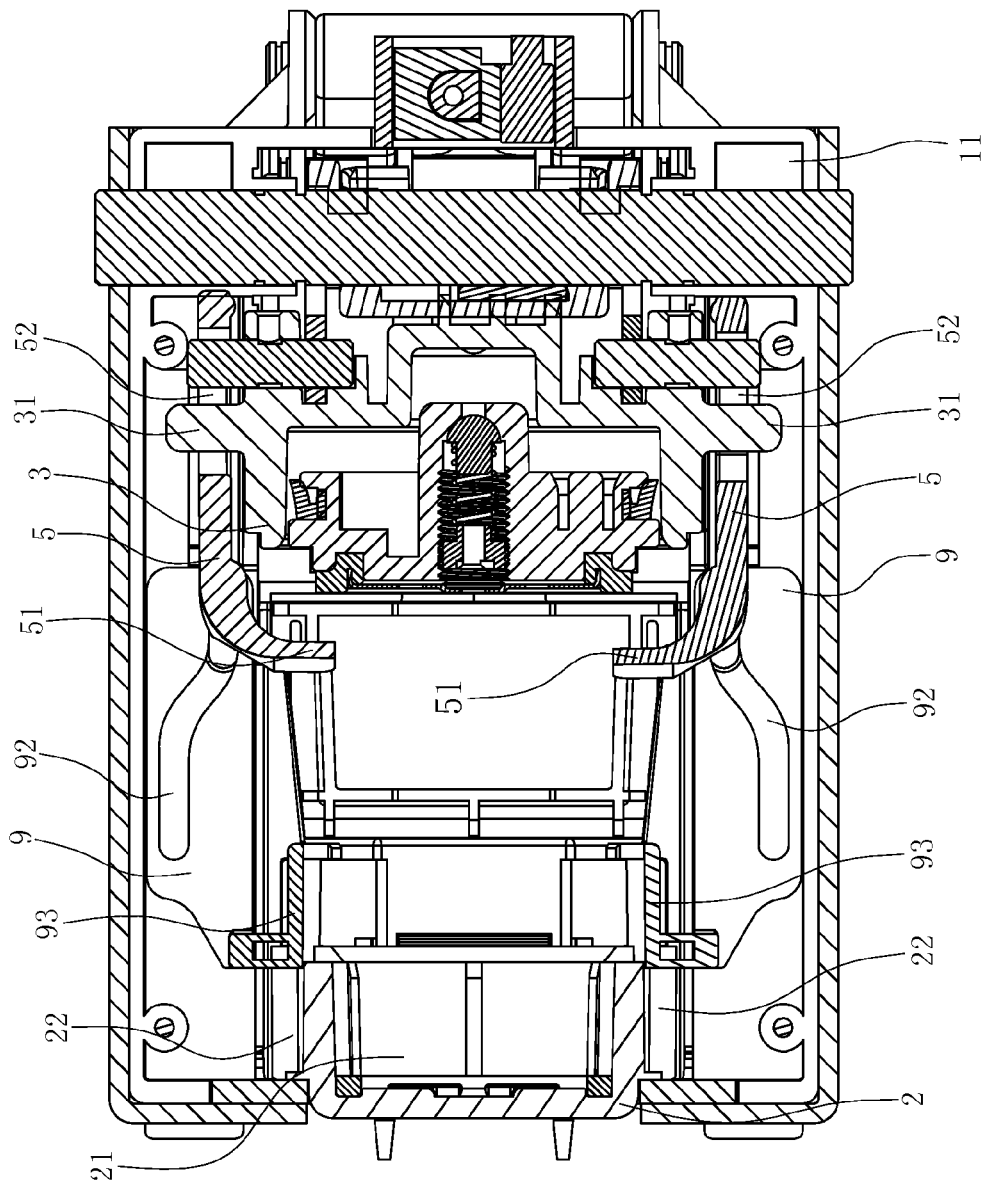
FIG. 5 is the sectional view of B-B way of FIG. 3.
Figure 6:
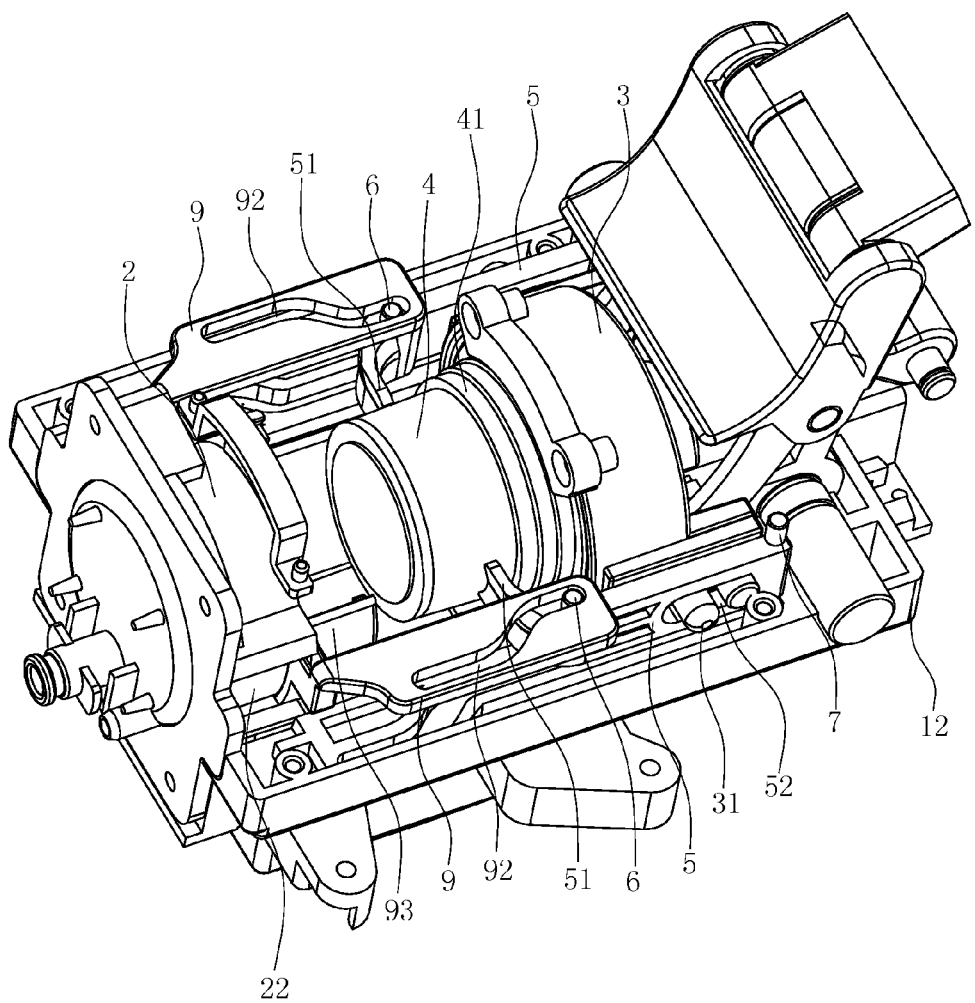
FIG. 6 is a perspective view of the beverage extraction device without the upper casing in accordance with the embodiment of the present invention (when the capsule is installed and the chamber is open).
Figure 7:
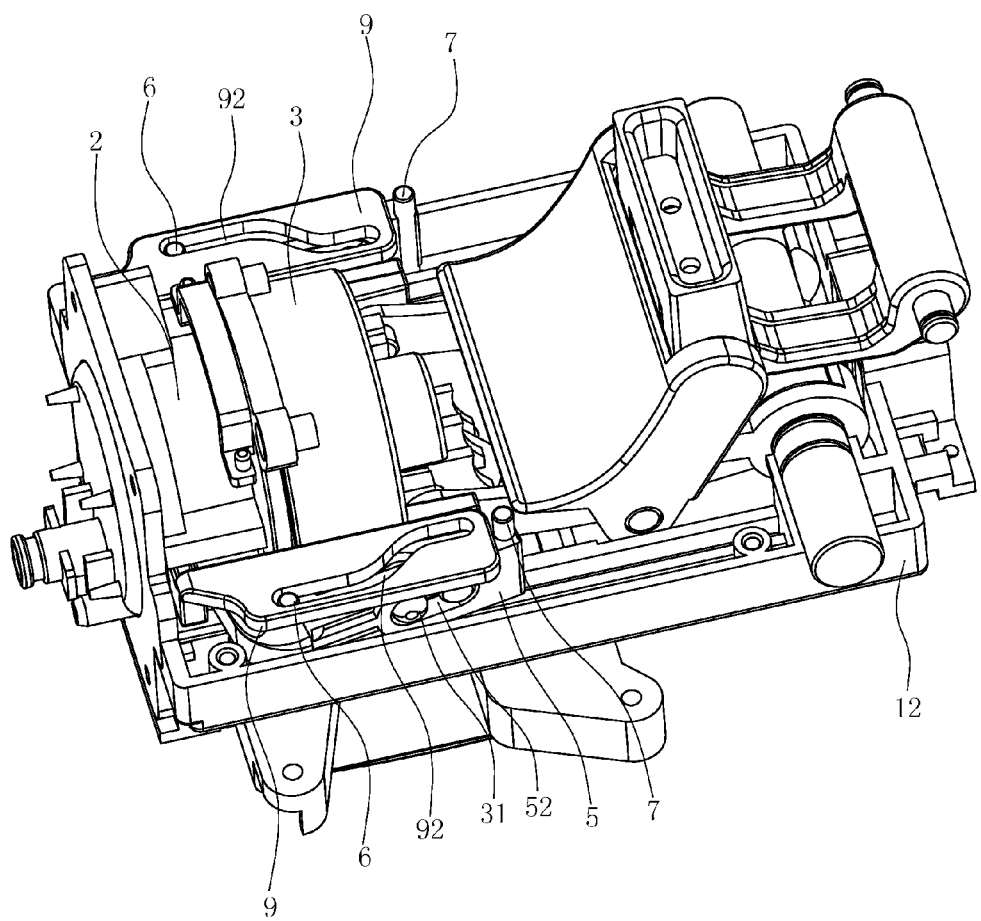
FIG. 7 is a perspective view of the beverage extraction device without the upper casing in accordance with the embodiment of the present invention (at the status of extraction and the chamber being close).
Figure 8:
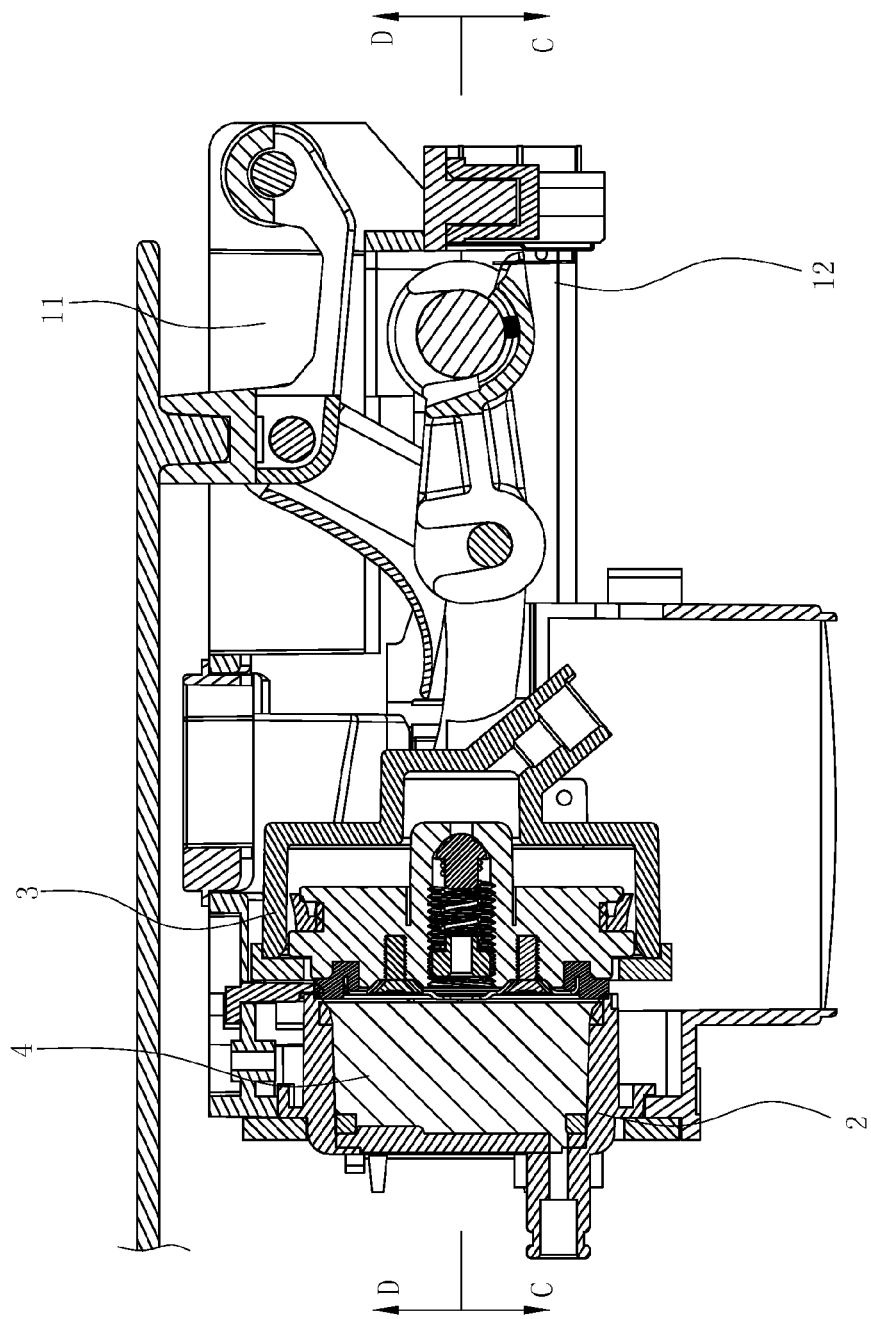
FIG. 8 is a sectional view of the beverage extraction device without the upper casing in accordance with the embodiment of the present invention (at the status of extraction and the chamber being close).
Figure 9:
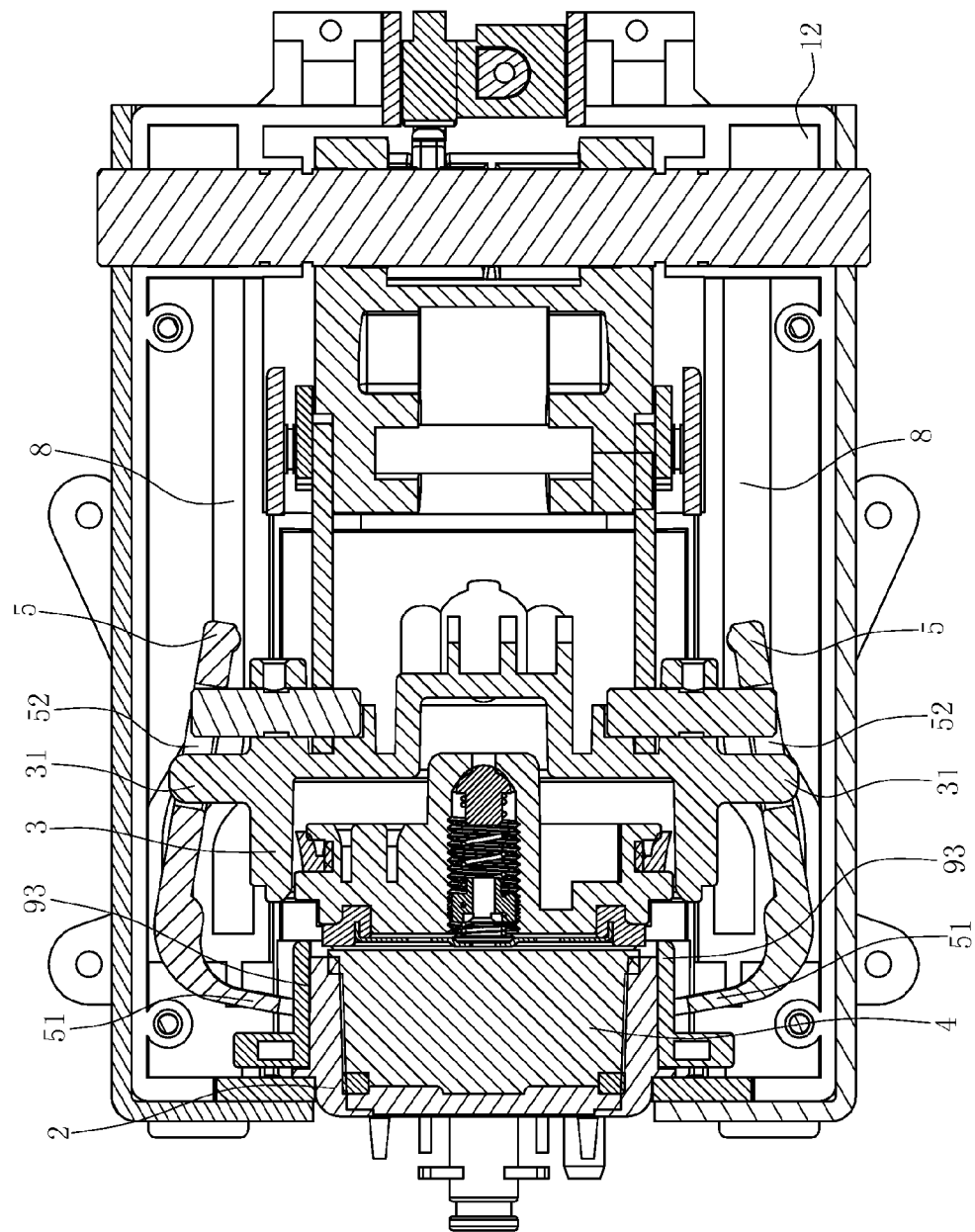
FIG. 9 is the sectional view of C-C way of FIG. 8.
Figure 10:
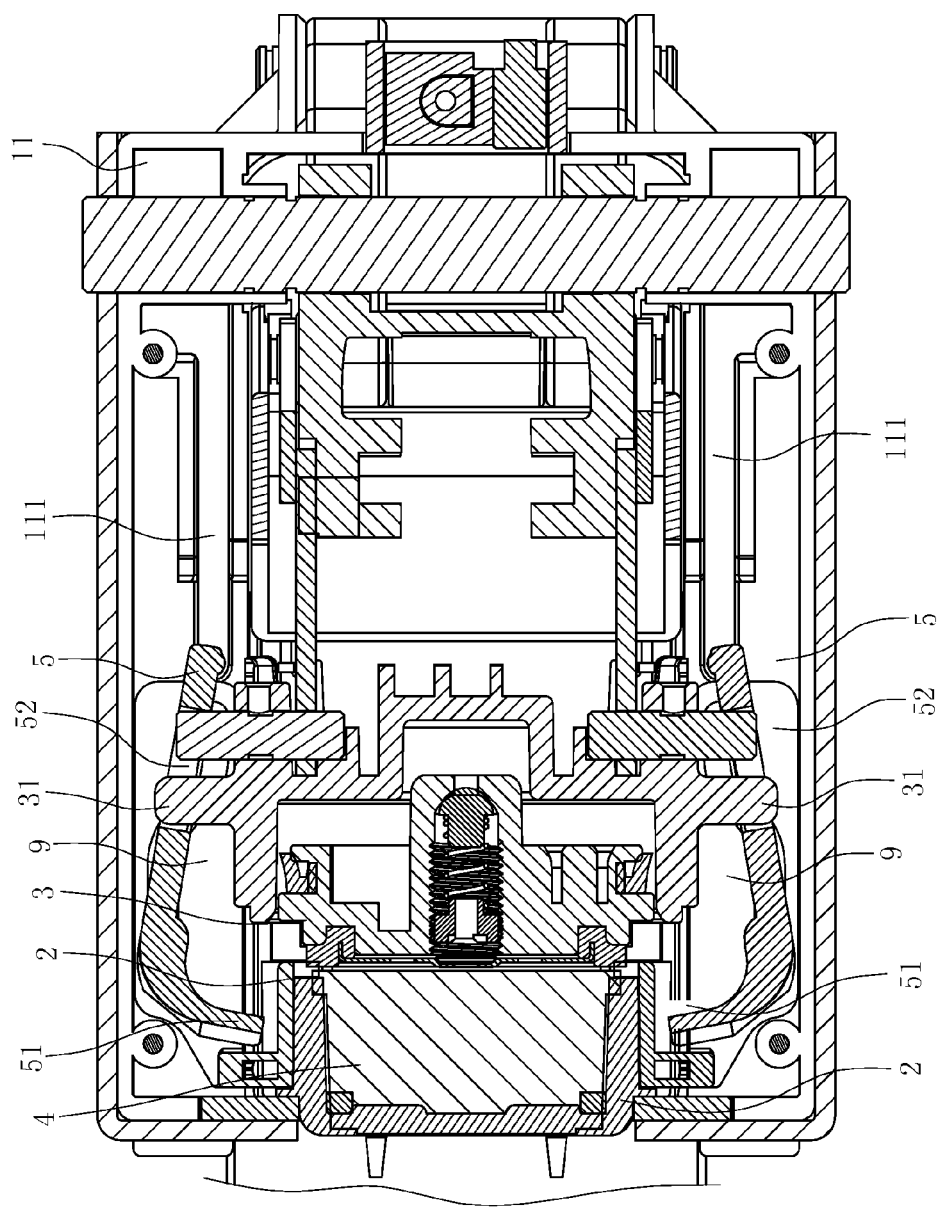
FIG. 10 is the sectional view of D-D way of FIG. 8.

To enable a further understanding of the innovative and technological content of the invention herein, refer to the detailed description of the invention and the accompanying drawings below. FIG. 1 to FIG. 19 show a preferred embodiment of the invention.

The beverage extraction device with easy rejection of capsules comprises a housing 1 and a first frame 2 and a second frame 3 disposed inside the housing 1. The housing 1 is composed of a lower casing 12 with a left side and a right side and an upper casing 11 with a left side and a right side, jointing up and down.

The first frame 2 is fixed on the front portion of the housing 1; the second frame 3 is limited inside the housing 1 and can slide forward and backward relatively to the first frame 2. As an integrated beverage extraction device, a driving mechanism for driving the second frame 3 to slide is also needed. The driving mechanism can be a connecting rod mechanism driven by a handle, it is a normal mechanism which can be referred to the Chinese Patent CN201044719Y (Patent No. ZL200720110811.2), titled Automatic Rejection Mechanism of Coffee Capsules in Coffeemaker.

Figure 19:
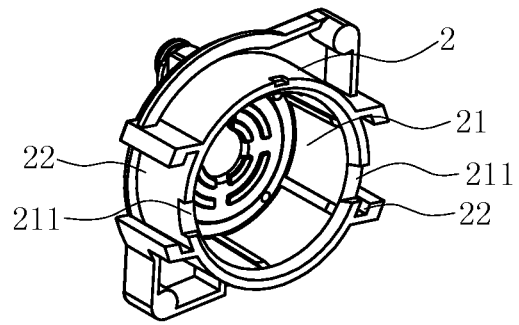
FIG. 19 is a perspective view of the first frame in accordance with the embodiment of the present invention.

A chamber 21 for holding the capsule 4 with a circular edge 41 is disposed inside the first frame 2; the capsule 4 can be coffee capsules; the periphery portion and the circular edge 41 of the chamber are made of hardness materials; the front and rear end faces of the capsule 4 are densely covered with slim holes for allowing water to pass through, and this is a normal structure adopted by the capsule in a coffeemaker. During extraction, the main bodies of the capsule enter into the chamber 21; and the circular edge 41 is attached to the front end face of the second frame 3, as shown in FIG. 19.

The left and right two sides of the second frame 3 are movably connected with a jaw 5 respectively. The jaws 5 can slide forward and backward along with the second frame 5. The structure of the jaws 5 disposed on the second frame 3 is as follows: the left and right two sides of the second frame 3 are provided with a protrusion 31, respectively; the middle portions of the jaws 5 are provided with inserting holes 52, wherein the crosswise inner diameter of the inserting holes 52 is greater than the diameter of the protrusions 31; the inserting holes 52 are strip-shaped holes, that is, the height of the inserting holes 52 is equal to or slightly greater than the diameter of the protrusions 31, and the crosswise width of the inserting holes 52 is greater than the diameter of the protrusions 31; the protrusions 31 penetrate into the inserting holes 52, which facilitates the two jaws 5 to open and close relatively to the second frame 3 and which also can lead to the limiting of the jaws 5 from the upper and lower sides.

Figure 18:
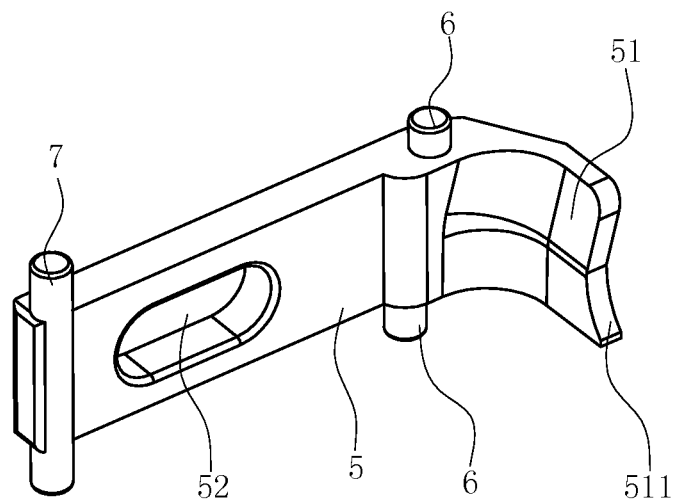
FIG. 18 is a perspective view of the jaw in accordance with the embodiment of the present invention.

As shown in FIG. 18, the front portion of each jaw 5 has a limiting part 51 bending and extending toward the front of the second frame 3. Each limiting part 51 has a lower portion 511 with a concave arc shape; therefore, the jaws are roughly in L shape. The two limiting parts 51 face each other and define a space between them for holding the capsule 4. The front portions of the jaws 5 can open and close relatively to the second frame 3; first shafts 6 are installed on the front portions of the jaws 5 along the height direction, and second shafts 7 are installed on the rear portions of the jaws 5 along the height direction.

Figure 11:
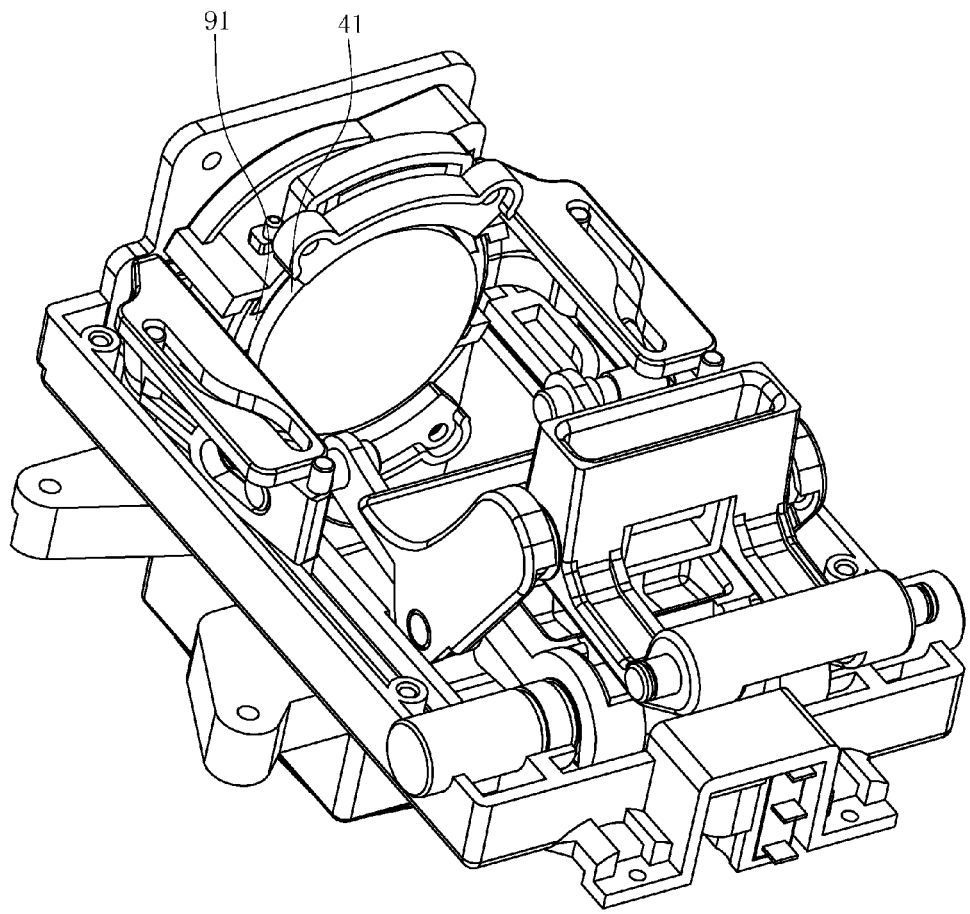
FIG. 11 is a perspective view showing the position of the capsule in accordance with the embodiment of the present invention (at the status of extraction and the chamber being close).

Two pairs of guiding grooves 8 are arranged on the housing 1 for guiding the first shafts 6 and the second shafts 7 of the corresponding jaws, as shown in FIG. 11. The two pairs of the guiding grooves 8 are arranged on the left and right sides of the lower casing 12. The guiding grooves 8 has a front end that bends outwardly; therefore, the guiding grooves 8 are substantially in Z shape, that is, the guiding groove 8 consists of a straight rear portion 81, a straight front portion 82 and an inclined middle portion 83 connecting the straight rear portion 81 and the straight front portion 82, wherein the inclined middle portion 83 is slantly arranged forward and outward. The second shaft 7 always slides inside the straight rear portion 81. Under the guide matching of the guiding grooves 8 and the first shafts 6, the front portions of the jaws 5 can be driven to complete one opening and closing relatively to the second frame 3 when the second frame 3 completes one whole forward and backward movement.

Figure 12:
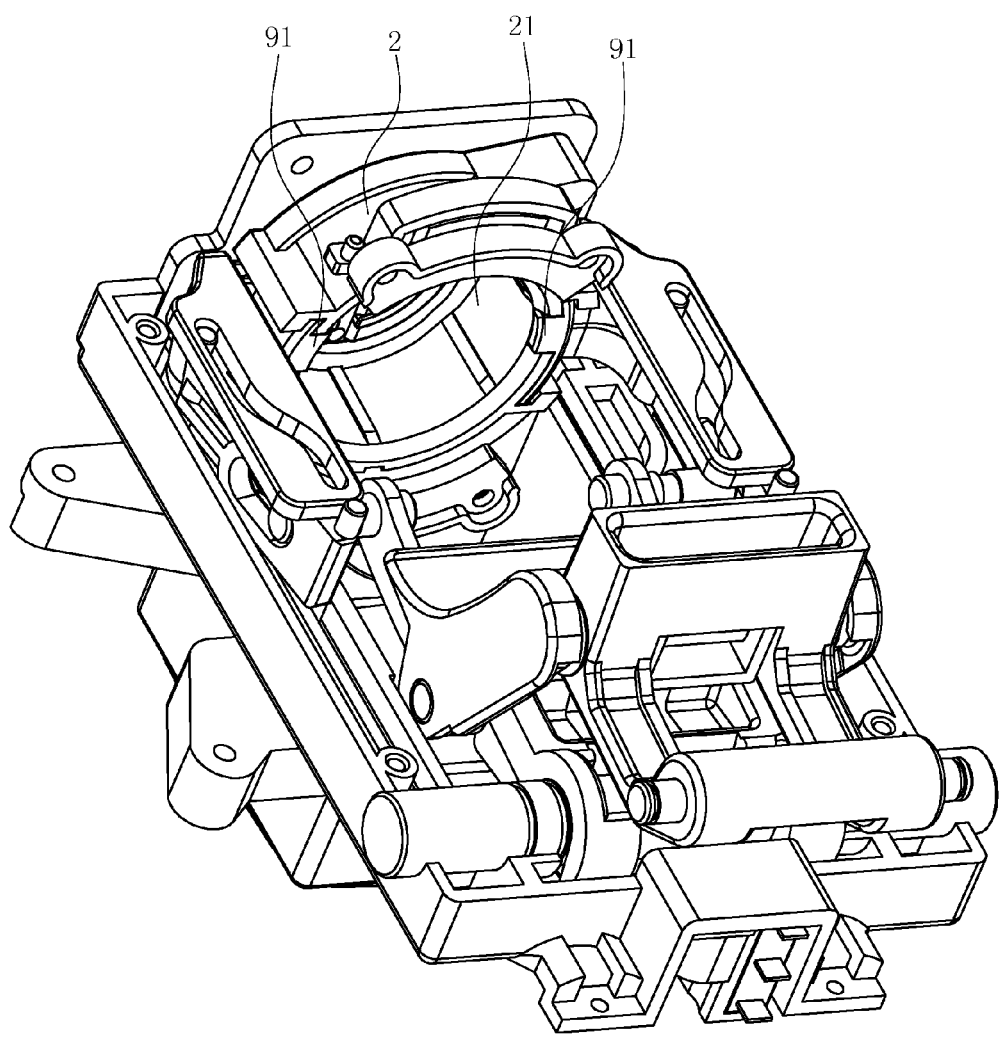
FIG. 12 is a perspective view showing the position of the pushing portion of the guiding plate in accordance with the embodiment of the present invention (at the status of extraction and the chamber being close).
Figure 17:
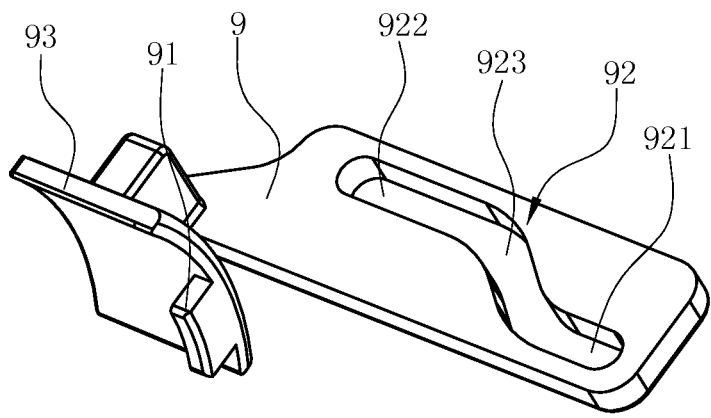
FIG. 17 is a perspective view of the guiding plate in accordance with the embodiment of the present invention.

As shown in FIG. 17, two guiding plates 9 are limited on the left and right two sides of the housing 1 and can only slide forward and backward; the left and right sides of the first frame 2 are provided with slots 22 disposed along the axial direction of the first frame 2; the front portions of the slots 22 are penetrated; the front portion of each guiding plate 9 is provided with an inserting board 93, wherein the inserting boards 93 are inserted in the slots 31 and can slide forward and backward; as shown in FIG. 12, the left and right sides inside the upper casing 11 are provided with straight grooves 111; the upper portions of the second shafts 7 can slide inside the straight grooves 111; limiting grooves 112 for guiding the guiding plates 9 forward and backward are arranged inside the upper casing 11; the front portions of the guiding plates 9 are provided with a convex pushing portion 91 for pushing the circular edge 41 of the capsule; the pushing portions 91 are installed on the inserting boards 93; the side wall of the chamber 21 of the first frame is provided with notches 211 for containing the pushing portions 91; the back portions of the guiding plates 9 are provided with leading grooves 92 having a front end that bends outwardly; therefore, the guiding grooves are substantially in Z shape, that is, the leading groove 92 consists of a straight rear groove 921, a straight front groove 922 and an inclined middle groove 923 connecting the straight rear groove 921 and the straight front groove 922, wherein the inclined middle groove 923 is slantly installed forward and outward; the first shaft 6 of the corresponding jaw is always located inside the leading groove 92 and can slide relatively; in the state that the front portions of the capsule 4 enter into the chamber 21, the first shaft 6 is located inside the straight front portion 82 and the foremost portion of the straight front groove 922 at the same time.

The operating principles and processes of the beverage extraction device are as follows:

As shown in the figures from FIG. 1 to FIG. 6, during the preparation of coffee, the circular edge 41 of the capsule 4 is held in the space between the two limiting parts 51; the capsule 4 can be stably limited on the front portion of the second frame 3 by both the limiting of the second frame 3 and the limiting part 51 and the supporting of the lower portion 511 with a concave arc shape attached to each limiting part 51; in this occasion, the bottom of the first shaft 6 and the second shaft 7 on the jaws are both located inside the straight rear portion 81 of the guiding groove 8; the top of the first shaft 6 is located inside the straight front portion 922 of the leading groove 92; the top of the second shaft 7 is located inside the straight groove 111; and then, the driving mechanism drives the second frame 3 to move forward relatively to the first frame 2; the bottom of the first shaft 6 and the second shaft 7 move forward inside the straight rear portion 81 of the guiding groove 8; when the main body of the capsule enters into the chamber 41 of the first frame 2, the bottom of the first shaft 6 enters into the straight front portion 82 passing through the inclined middle portion 83; the top of the first shaft 6 enters into the straight front groove 922 passing through the inclined middle groove 923; the top and the bottom of the first shaft 6 gradually shift along with moving forward, and the horizontal position of the second shaft 7 remains unchanged, accordingly, the limiting parts 51 of the jaws 5 gradually open relatively to the second frame 3 until the top of the first shaft 6 is against with the front end of the straight front groove 922 of the leading groove 92; then, the second frame 3 continuously moves forward; the first shaft 6 pushes the guiding plate 9 to move forward; when the bottom of the first shaft 6 moves to the foremost portion of the straight front portion 82 of the guiding groove 8, the limiting parts 51 of the jaws 5 are located at left and right sides of the first frame 2; the pushing portion 91 of the guiding plate 9 is located in the notches 211, at the same time, the first frame 2 and the second frame 3 are completely closed to each other, and then, the device starts extracting, as shown in figures from FIG. 7 to FIG. 12.

In the whole process, the bottom of the second shafts 7 are always located in the straight rear portion 81 of the guiding groove 8, and the top of the second shafts 7 are always located in the straight groove 111.

Figure 13:
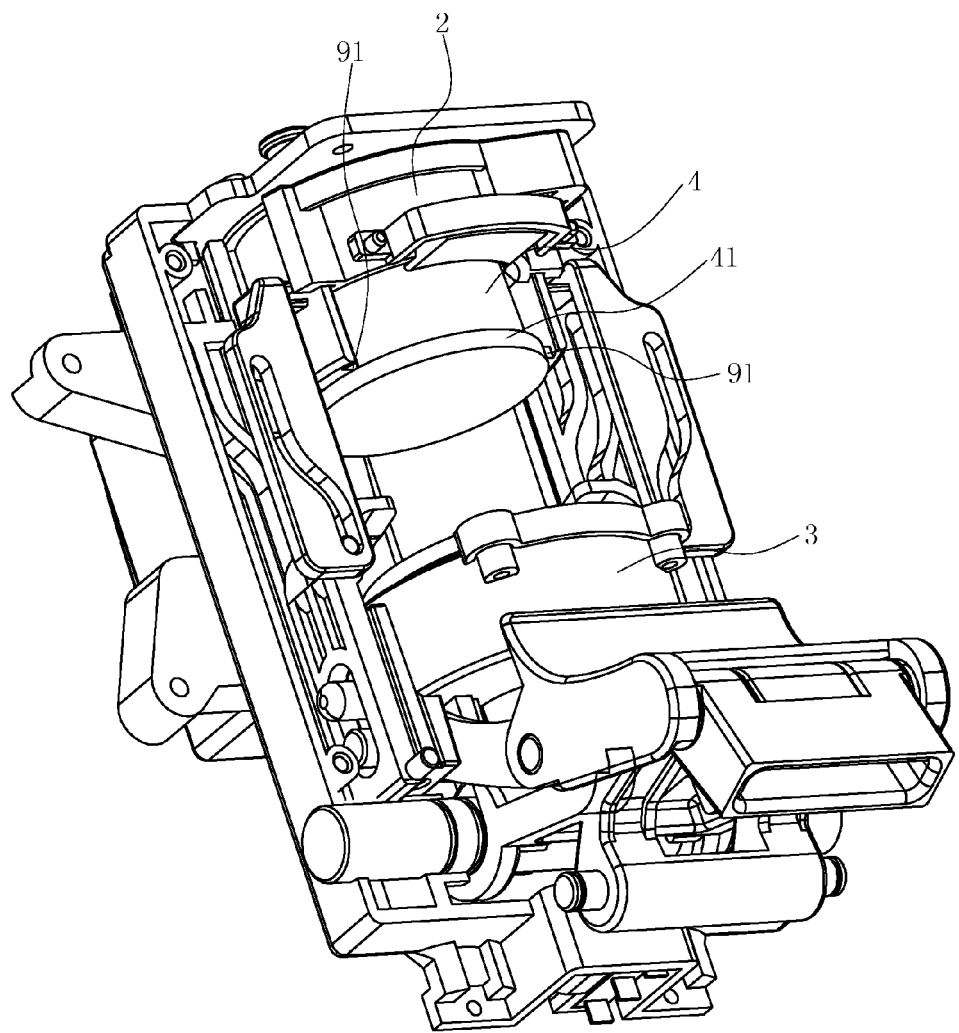
FIG. 13 is a perspective view of the beverage extraction device without the upper casing in accordance with the embodiment of the present invention (in the process of the rejection of the capsule).
Figure 14:
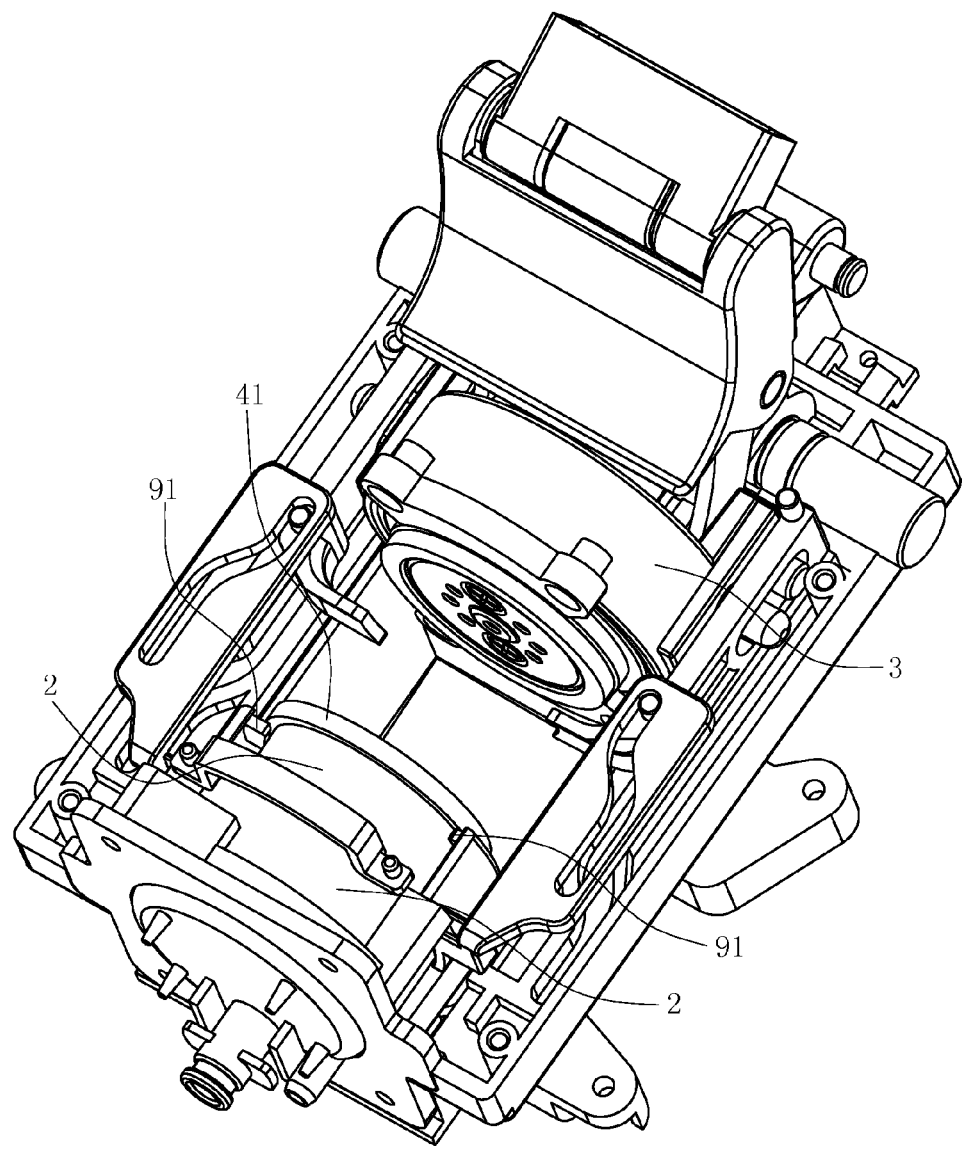
FIG. 14 is another perspective view of the beverage extraction device without the upper casing in accordance with the embodiment of the present invention (in the process of the rejection of the capsule).
Figure 15:
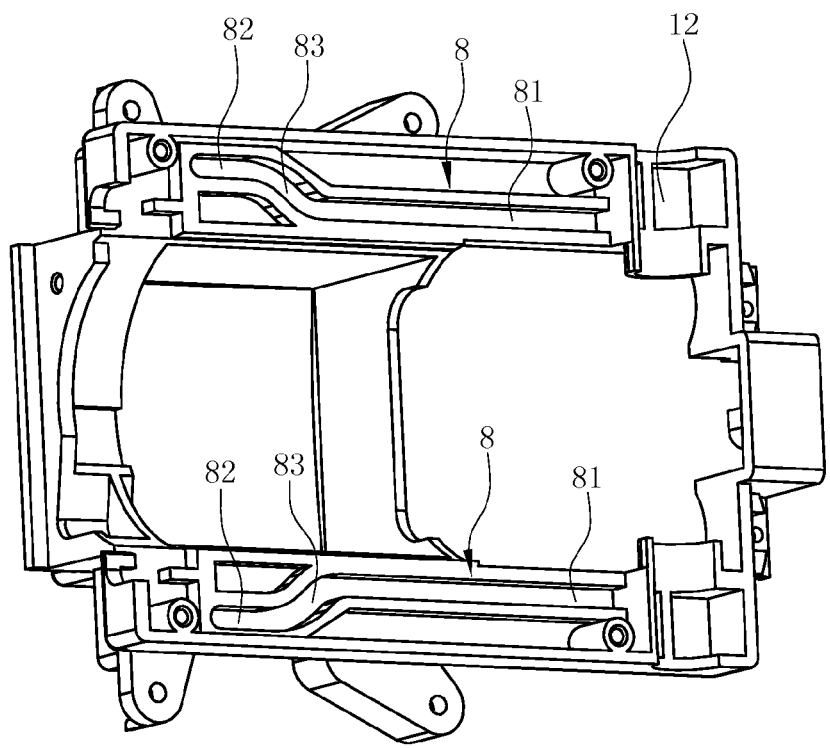
FIG. 15 is a perspective view of the lower casing in accordance with the embodiment of the present invention.
Figure 16:
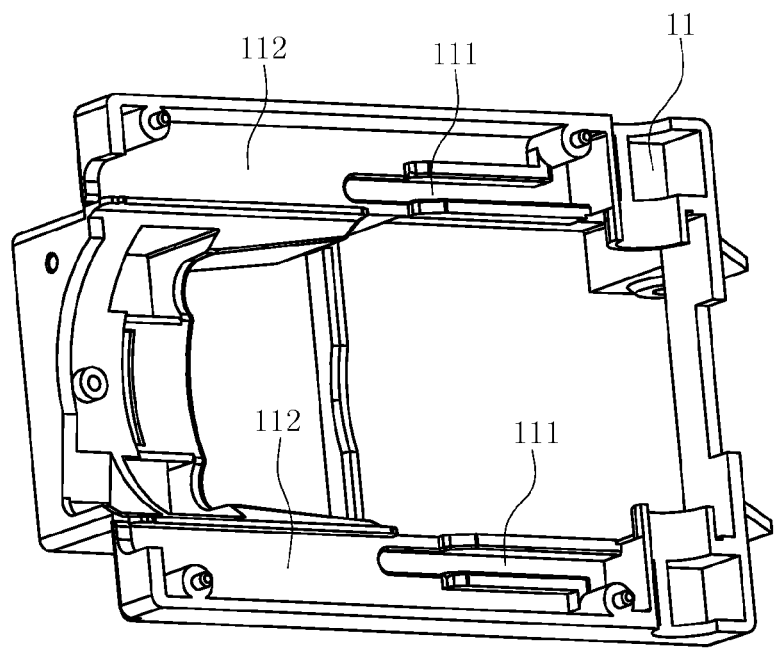
FIG. 16 is a perspective view of the upper casing in accordance with the embodiment of the present invention.

As shown in FIG. 13 and FIG. 14, after the beverage is prepared, the second frame 3 moves backward relatively to the first frame 2; when the bottom of the first shaft 6 enters into the straight front portion 82 passing through the inclined middle portion 83, the top of the first shaft 6 enters into the straight front groove 922 passing through the inclined middle groove 923, the top and bottom of the first shaft 6 gradually shift along with moving backward; the horizontal position of the second shaft 7 remains unchanged, accordingly, the limiting parts 51 of the jaws 5 gradually close relatively to the second frame 3 until the device returns to the original state; at this time, the capsule 4 remains locating in the chamber 21 of the second frame 2 until the top of the first shaft 6 is against with the rear end of the straight rear groove 921 of the leading groove 92; then, the second frame 3 continuously moves backward; the first shaft 6 pushes the guiding plate 9 to move backward; the pushing portion 92 of the guiding plate 9 pushes the circular edge of the capsule 4 outward in order to push the capsule 4 out of the chamber 21, completing rejection of capsule 4; at this time, the jaws 5 are in the original state.

The invention claimed is:

1. A beverage extraction device with easy rejection of capsules, comprising:
    a housing having a central line and two sides;
    a first frame and a second frame both disposed inside the housing, the first frame having a length and a chamber with a side wall for holding a beverage ingredient capsule with a circular edge, the second frame having a front and two side supports and the second frame being slidable along the length of the first frame;
    two jaws, each jaw being movably connected to a side support of the second frame, and the two jaws being slidable together with the second frame, each jaw having a front portion and a back portion, the front portion of each jaw extending to the front of the second frame for holding the capsule;
    two guiding plates slidably mounted on the two sides of the housing;
    wherein each jaw has a plurality of shafts, one of which is fitted and assembled in a guiding rail formed on each side of the housing, and when the second frame slides forward to an intermediate position, the second frame drives the front portions of two jaws to open, and when the second frame slides backward to the intermediate position, the second frame drives the front portions of two jaws to close;
    each guiding plate has a pushing portion protruding towards the central line of the housing for pushing the circular edge of the capsule, and the side wall of the chamber of the first frame is provided with two notches for receiving the two pushing portions;
    a leading groove is defined on each guiding plate, which has a front end that bends outwardly, and one of the shafts of each jaw can slide inside the corresponding leading groove and drive each guiding plate to slide forward and backward.

2. The beverage extraction device of claim 1, wherein the front portion of each jaw has a limiting part bending and extending toward the front of the second frame, the two limiting parts face each other and define a space between them for holding the capsule.

3. The beverage extraction device of claim 2, further comprising a lower portion with a concave arc shape attached to each limiting part.

4. The beverage extraction device of claim 1, wherein the shafts of each jaw comprises a first shaft and a second shaft, the first shaft is formed on the front portion of each jaw protruding transversally away from each jaw, the second shaft is formed on the back portion of each jaw protruding transversally away from each jaw, and
    each guiding rail further comprises one guiding groove, one guiding groove on each side of the housing is for guiding both the first shaft and the second shaft of each jaw, and each guiding groove has a front end that bends outwardly,
    when the first shaft slides along the guiding groove, the second frame drives the front portion of each jaw to complete one opening and one closing during the second frame completes one whole forward and backward movement;
    the first shaft of each jaw is located in the corresponding leading groove and slides inside the leading groove;
    when the front end of the capsule enters the chamber, the two jaws open and each first shaft is located at a foremost end of the corresponding leading groove, the two guide plates can be driven to move forward;

when the two jaws are in a closed position and each first shaft is located at a rearmost end of a corresponding leading grooves, the two guiding plates can be driven to move backward and so as to make the capsule leave from the chamber.

5. The beverage extraction device of claim 4, wherein each guiding groove consists of a straight rear portion, a straight front portion, an inclined middle portion connecting the straight rear portion and the straight front portion; the inclined middle portion slants from the straight rear portion outwardly to the straight front portion, and the second shaft slides inside the straight rear portion;

the leading groove consists of a straight rear groove, a straight front groove, and an inclined middle groove connecting the straight rear groove with the straight front groove; the inclined middle groove slants from the straight rear groove outwardly to the straight front groove; and when the front portion of the capsule is in the chamber, the first shaft is in the straight front portion and also at the foremost end of the straight front groove.

6. The beverage extraction device of claim 4, wherein the first frame has two opposing slots, the two opposing slots are parallel with the central line of the housing, an inserting board is attached to each guiding plate for engaging the slot and can slide forward and backward, and each pushing portion is attached to the inserting board.

7. The beverage extraction device of claim 4, wherein two protrusions, opposing to each other, are attached to the side wall of the second frame, and an inserting hole is formed on each jaw for the protrusions to pass through.

8. The beverage extraction device of claim 4, wherein the housing is composed of a lower casing with a left side and a right side and an upper casing with a left side and a right side, the upper casing covering on the lower casing, the two guiding grooves are respectively formed at the left side and the right side of the lower casing, two straight sliding grooves is formed at the left side and the right side of the upper casing for receiving the second shafts.

9. The beverage extraction device of claim 8, wherein two limiting grooves are formed on the upper casing, one limiting groove on the left side and one limiting groove on the right side, for guiding movement of the guiding plates.

* * * * *